(12) United States Patent
Tolbert et al.

(10) Patent No.: US 7,340,477 B1
(45) Date of Patent: Mar. 4, 2008

(54) METHOD AND SYSTEM FOR A TELEMETRY WAREHOUSE FOR STORING, RETRIEVING AND ANALYZING DATA

(75) Inventors: Douglas Marshall Tolbert, Newport Beach, CA (US); Sandra Motter Hickoff, Irvine, CA (US); James Albert Fontana, MissionViejo, CA (US)

(73) Assignee: Unisys Corporation, Blue Bell, PA (US)

( * ) Notice: Subject to any disclaimer, the term of this patent is extended or adjusted under 35 U.S.C. 154(b) by 660 days.

(21) Appl. No.: 10/737,675

(22) Filed: Dec. 16, 2003

(51) Int. Cl.
*G06F 17/30* (2006.01)
*G06F 7/00* (2006.01)

(52) U.S. Cl. ...................... 707/102; 707/204
(58) Field of Classification Search ............... 707/102, 707/204, 203
See application file for complete search history.

(56) References Cited

U.S. PATENT DOCUMENTS

| | | | |
|---|---|---|---|
| 6,490,721 B1 | 12/2002 | Gorshkov et al. | |
| 6,567,814 B1 | 5/2003 | Bankier et al. | |
| 6,633,834 B2 | 10/2003 | Conrad et al. | |
| 6,633,883 B2 | 10/2003 | Koskas | |
| 2002/0099563 A1* | 7/2002 | Adendorff et al. | 705/1 |
| 2002/0133368 A1* | 9/2002 | Strutt et al. | 705/1 |
| 2003/0033179 A1* | 2/2003 | Katz et al. | 705/7 |
| 2004/0243607 A1* | 12/2004 | Tummalapalli | 707/100 |

OTHER PUBLICATIONS

Oracle® Enterprise Manager Concepts Guide, Release 9.2.0, Mar. 2002, ORACLE®.*
Oracle9i Database Performance Tuning Guide and Reference, Release 9.2, Oct. 2002, ORACLE®.*
Ralph Kimball, "The Data Warehouse Toolkit", The Dimensional Model Section, 1996, Chapter 1, pp. 10-11.

* cited by examiner

*Primary Examiner*—Kuen S. Lu
(74) *Attorney, Agent, or Firm*—Alfred W. Kozak; Robert P. Marley; Charles A. Johnson

(57) ABSTRACT

A telemetry warehouse provides a consolidated system log in the form of a data warehouse which contains data collected from traditional sources such as system management tools, performance monitoring tools, and various system logs while allowing analysis across the entire range of management data.

6 Claims, 6 Drawing Sheets

Warehouse Architecture

System Warehouse Relational Schema

Back Up or Delete Data - (local)

Time | Source | Partition | Collection | User | Measure | Event

Start Time

[ ▶ ] M/d/YYYY     [ ▶ ] hh:mm:ss AM/PM

End Time

[ ▶ ] M/d/YYYY     [ ▶ ] hh:mm:ss AM/PM

Back Up    Delete    Cancel    Clear    Help

*Fig. 5*

METHOD AND SYSTEM FOR A TELEMETRY WAREHOUSE FOR STORING, RETRIEVING AND ANALYZING DATA

CROSS-REFERENCES TO RELATED CASES

This application is related to an issued patent U.S. Pat. No. 6,026,408 entitled "METHOD FOR SYNCHRONIZING THE SCHEMA OF A DATABASE WITH ITS REPRESENTATION IN AN OBJECT-ORIENTED REPOSITORY", which is incorporated herein by reference.

This application is related to a application U.S. Ser. No. 10/290,812 entitled "SYSTEM AND METHOD FOR MANAGING THE APPLICATION OF PARAMETERIZED BEHAVIOR TO OPERATIONS IN A COMPONENT HIERARCHY", now abandoned which is incorporated herein by reference.

This application is related to a application U.S. Ser. No. 10/670,976 entitled "SYSTEM AND METHOD FOR MAINTAINING TARGET RESPONSE TIMES IN BUSINESS METHODS", which issued Oct. 3, 2006 as U.S. Pat. No. 7,117,184 and which is incorporated herein by reference.

BACKGROUND OF THE INVENTION:

1. Field of the Invention

The present invention generally relates to the ability to store sporadically recurring performance metrics and other system events in a common store in a form that facilitates analysis with available software tooling without the necessity of database schema modifications.

2. Description of Related Art

An existing problem today is how to enable the ability to store sporadically recurring performance metrics and other system events in a common store in a form that facilitates analysis with available software tooling without the necessity of database schema modifications.

It is therefore important to apply prior art database structuring techniques from other fields to the specific needs of the aforementioned problem. The specific prior art employed includes a "star schema" relational database description frequently used in the construction of data warehouses. The specific star schema employed has been adapted to meet specific needs of the problem. This star schema is described in: "The Data Warehouse Toolkit" by Ralph Kimball, published by John Wiley & Sons Inc, c. 1996, Chapter 1, section titled "The Dimensional Model". One related art method to which the method of the present invention generally relates is described in U.S. Pat. No. 6,633,834, entitled "Baselining Of Data Collector Data". This is a network management node which monitors network attributes of a network. The network management node is connected to network devices through the network and receives data values associated with measured network attributes from said network devices. The data values are stored in the network management node and a baseline value and rearm baseline value for a network attribute are calculated from a plurality of the received data values measured during a first period of time (e.g., a first time bucket). These data values are compared to the baseline value, and an alarm is generated in response to at least one of these data values exceeding the baseline value. The alarm is reset if at least one subsequently measured data value is below the rearm baseline value. The baseline value and rearm baseline value are recalculated from received data values measured during subsequent time buckets. Data values measured during the subsequent time buckets are compared to corresponding baseline and rearm baseline values.

The present invention differs from the above prior cited art in that the prior invention, focuses on a threshold-based alert mechanism which is not the focus of the present invention. The present invention can store performance metrics in a common store enabling analysis of the stored metrics but does not require baseline or rearm baseline values.

Another related art method to which the method of the present generally relates is described in U.S. Pat. No. 6,633,883 entitled "Methods Of Organizing Data And Processing Queries In A Database System, And Database System And Software Product For Implementing Such Methods". This prior related art method includes a reference table, which may not be stored, has columns associated with data attributes and rows containing related words assigned to those attributes in a collection of data. The stored data include at least one macroword thesaurus associated with an attribute and with a prefix length shorter than a word length of said attribute, and reference table row identifier lists respectively associated with thesaurus entries. Each macroword thesaurus associated with an attribute and with a prefix length has a respective entry for each prefix value having this prefix length and matching a corresponding prefix of at least one word assigned to this data attribute in the collection of data.

The present invention generally differs from the above prior cited art in that the prior invention, focuses on data collection but not with the Collection Manager facility of the present invention, which provides a framework and API permitting clients to define, initiate and manage the collection of selected types of performance data using a System Telemetry Warehouse API.

BRIEF SUMMARY OF THE INVENTION:

An embodiment of the invention provides the ability to utilize a collection system for gathering performance data on remote machines, and loading said performance data into a data warehouse in order to allow analysis across the entire range of management data, as well as across multiple servers.

The method of the present invention, therefore, provides a consolidated system log in the form of a data warehouse, which contains data collected and allows analysis across the entire range of management data (hardware, system software and application software).

System Telemetry Warehouse clients use standard SQL queries to retrieve and analyze data in the warehouse. However, clients need to understand the warehouse schema in order to properly formulate those queries. Some sample queries are provided as stored procedures in the warehouse database.

A single, general-purpose star schema is used for the warehouse. It supports the storage of various kinds of performance data at various times without requiring any schema changes.

The star schema consists of a fact table surrounded by seven dimension tables. Each row in the fact table contains a single measured numeric value, an optional text string and references to the other tables. The dimension tables contain descriptive information about the measured values such as the measurement name, the machine on which it was collect d, and the tim it was collected. Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIG. 5 is a screen shot illustrating the back up or delete data capability in the System Telemetry Warehouse user interface.

GLOSSARY ITEMS

Figure 1:
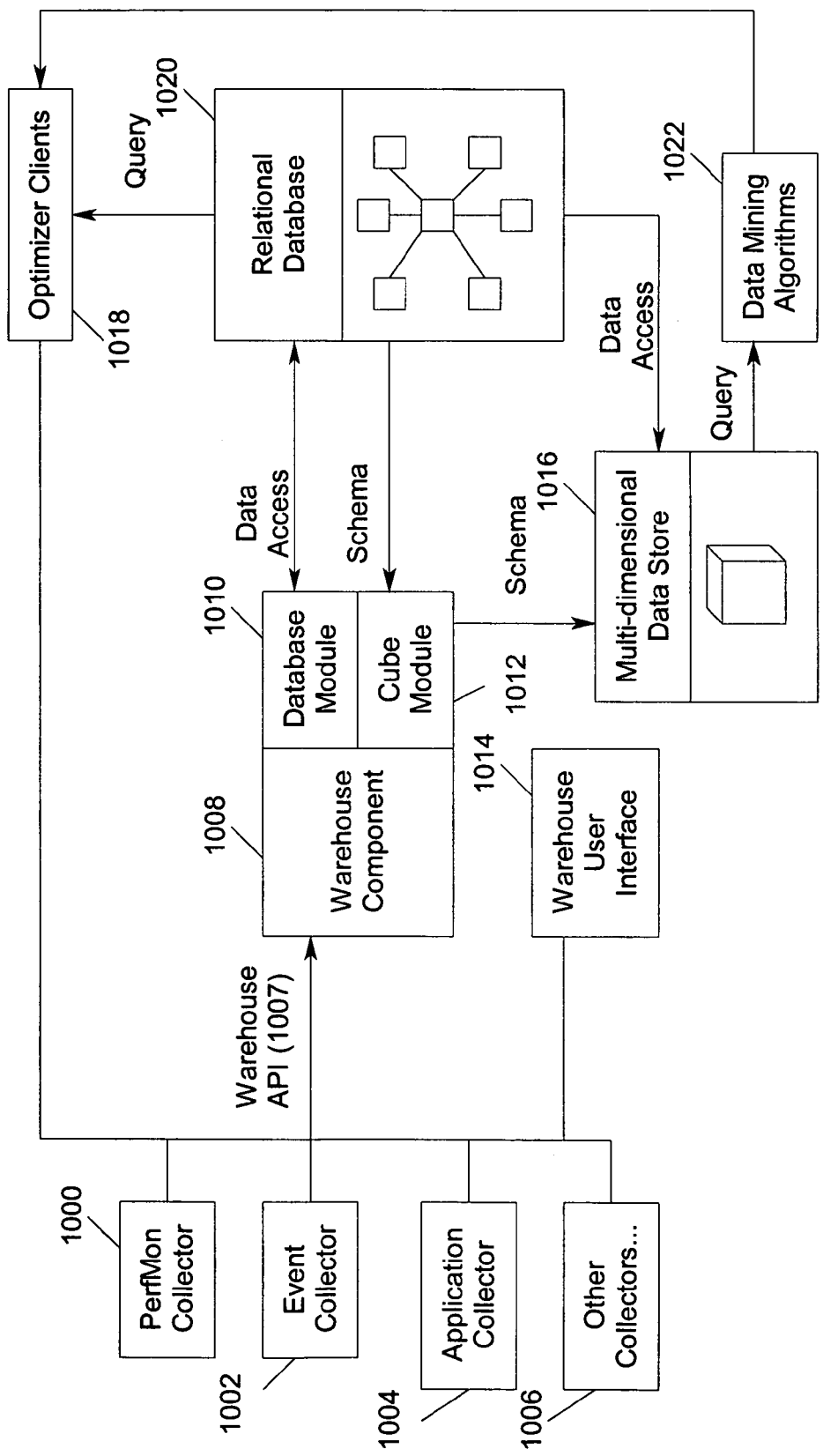
FIG. 1 is a diagram illustrating the Warehouse Architecture.

1. Component Runtime Conditioner (CRC): A suite of tools and technologies that enable a user to tune, optimize and add-value to component-based applications. The CRC consists of core technologies and conditioning tools.

2. System Telemetry Warehouse: Used to collect and store system performance data in the form of a data warehouse. The System Telemetry Warehouse contains data collected from a variety of traditional sources such as system management tools, performance-monitoring tools, and system logs.

3. Data Warehouse: A generic term for a system for storing, retrieving and managing large amounts of any type of data. Data warehouse software often includes sophisticated compression and hashing techniques for fast searches, as well as advanced filtering.

4. Performance Metrics: Information about how a system is performing. Some examples are memory, processor, disk or network utilization as well as application response times.

5. Common Store: A single location for storing information from multiple systems.

6. Software Tooling: Software programs. In this context, data warehouse and data mining programs.

7. Schema: A description of objects in a relational database such as tables, columns, indexes and permissions.

8. Star Schema: A relational database structur in which data is maintained in a single fact table at the center of the schema with additional dimension data stored in dimension tables. Each dimension table is directly related to and usually joined to the fact table by a key column. Star schemas are used in data warehouses.

9. Relational Database: A database based on the relational model developed by E. F. Codd. A relational database allows the definition of data structures, storage and retrieval operations and integrity constraints. In such a database the data and relations between them are organized in tables.

10. Data-Mining Product: A product which supports data mining activities. Specifically, data-driven discovery of models and patterns from massive observational data sets. Typical data mining tasks include exploration, visualization, clustering (grouping), pattern finding and prediction.

11. PerfMon: Refers to Microsoft Windows performance monitoring counters. For example: Processor(_Total)\% Interrupt Time or Physical Disk(_Total)\% Disk Read Time.

12. Collection Manager: A collection system for gathering performance data on local or remote machines and storing it in the System Telemetry Warehouse.

13. API (Application Programming Interface): The interface (calling conventions) by which an application program acc sses the operating system and other services. An API is defined at source code level and provides a level of abstraction between the application and the kernel (or other privileged utilities) to ensure the portability of the code.

14. Target Partition: A machine where data collection occurs for the Unisys ES7000 Server.

15. Management Server: A machine where the data is loaded into the System Telemetry Warehouse The System Telemetry Warehouse is a specific instance of a data warehouse.

16. Multi-Dimensional (MDX) queries: See MDX.

17. Warehouse Maintenance: The removal of warehouse data based on dimension information such as time, machine name, or collection group. Also includes backup and restoration of deleted data.

18. Data Collection GUI: The ability to define, initiate, and manage data collection directly without running an optimizer.

19. Warehouse Options: Facilities which include the name of the folder to be used for warehouse backups and an option to enable the logging of collection status messages.

20. DCOM (Distributed Component Object Model): An extension of COM (for distributed applications), DCOM was developed by Microsoft for Windows Operating Systems. It supports objects distributed across a network, much like IBM's DSOM protocol, which is an implem ntation of CORBA.

21. COM+(Component Object Model): A Microsoft Windows development platform that is made up of several core technologies that provide the basic building blocks for constructing multitier business applications.

22. Fact Table: The centra-table in a star schema which contains the measured numeric values of performance data.

23. Dimension Table: The surrounding tables in a star schema which describe characteristics of the data in the central fact table.

24. SQL: Structured Query Language—consists of a set of facilities for defining, accessing and otherwise managing relational databases.

25. SQL Server: The Microsoft relational database management system.

26. MDX: Multidimensional Expressions—A syntax used for defining multidimensional objects and querying and manipulating multidimensional data.

27. STW (System Telemetry Warehouse) User Interface: A graphical user interface that allows users to perform warehouse maintenance, set warehouse options and perform data collection.

28. CRC Project: See Component Runtime Conditioner (definition 2).

29. Custom Log File: A Windows event log file other than the three standard logs used by Windows-application, security and system. A custom event log file is usually creat d by and for a specific application.

30. CMP: Unisys Cellular MultiProcessing, a multiprocessing system where computing elements can be broken down into individual cells, or partitions. These cells can work together with other cells, that may be operating under different operating systems as well as with widely varied applications 31. Event Log Collector: A module which collects data from Windows event logs for storage in the System Telemetry Warehouse.

32. Collectors (in this context): Modules which collect data for storage in the System Telemetry Warehouse.

33. PerfMon Collector: A module which collects Windows performance metrics for storage in the System Telemetry Warehouse.

34. Application Collector: A module which collects data about Application performance for storage in the System Telemetry Warehouse.

35. Warehouse Component: A COM component which provides an API for storing data in the System Telemetry Warehouse.

36. Cube Module: A module which creates multi-dimensional data stores known as cubes from the relational warehouse database.

37. Optimizer Clients: Software programs which use the System Telemetry Warehouse to collect and analyze performanc data with the goal of improving application or system performance. See also glossary item #43.

38. Warehouse User Interface: See STW User Interface.

39. Multi-Dimensional Data Store: A set of data that is usually constructed from a subset of a data warehouse and is organized and summarized into a multidimensional structure defined by a set of dimensions and measures.

40. Component: Software components are defined as prefabricated, pre-tested, self-contained, reusable software modules—bundles of data and procedures—that perform specific functions.

41. Optimizer: A software program which uses the System Telemetry Warehouse to collect and store performance metrics which the optimizer then analyzes to make recommendations regarding how to improve system performance. See also glossary item #39.

42. COM (Component Object Model): A Microsoft component software interface specification encapsulating code in an object-oriented fashion allowing component reuse, interface discovery, and dynamic linkage of separately developed software components.

GENERAL OVERVIEW

There are two main functions required to create a warehouse consisting of performance data. The first is a collection system for gathering performance data on remote machines. This function is referred to by its main component, the Collection Manager. The second function is the loading of the performance data into a data warehouse. This function is referred to as the System Telemetry Warehouse. API's are provided for both functions.

The Collection Manager subsystem provides a framework and an API that allows clients (also referred to as optimizers) to define, initiate, and manage the collection of various types of performance data.

The Collection Manager is designed to manage an extensible list of collectors. A basic set of collectors is provided, including collectors for PerfMon counters, event logs and component performance information.

Clients may provide their own collectors and use the Collection Manager API to initiate them. These collectors can use the System Telemetry Warehouse API to store collected data into the warehouse.

The Collection Manager supports data collection on multiple remote machines as well as on the local machine. This requires that various modules be installed on the following machines:

Target partition—This is where data collection occurs.

Management server—This is where the data is loaded into the data warehouse.

The System Telemetry Warehouse provides an API for loading the collected performance data into a SQL Server database in the form of a data warehouse. A single, general-purpose star schema is used for the warehouse. It supports the storage of various kinds of performance data at various times without requiring any schema changes. In a standard, commercial data warehouse the specific data to be collected (ex: quantity sold, sale price, etc) is known in advance. If the list of collected data changes, the warehouse schema must also be changed.

The star schema consists of a fact table surrounded by seven dimension tables. Each row in the fact table contains a single measured numeric value, an optional text string and references to the other tables. The dimension tables contain descriptive information about the measured values such as the measurement name, the machine on which it was collected, and the time it was collected.

System Telemetry Warehouse clients can use standard SQL queries for data retrieval and analysis. Usage of the star schema also enables the creation of multi-dimensional data stores (cubes) allowing clients to use multi-dimensional (MDX) queries and automated creation of multi-dimensional data stores.

A Collection Manager API exists which allows System Telemetry Warehouse clients to interface to the collection system for the purpose of defining and initiating the collection of performance data. The functions provided by this interface allow clients to:

Define and manage groups of performance counters.

Initiate and stop data collection.

Check on the status of data collection.

It should be noted that the Collection Manager is installed as a COM+ application. Clients on remote machines can access the interface via DCOM.

DETAILED DESCRIPTION:

The goal of the System Telemetry Warehouse is to provide a consolidated system log in the form of a data warehouse. The System Telemetry Warehouse contains data collected from traditional sources such as system management tools, performance monitoring tools, and various system logs. Additionally, information regarding application and system software components is collected. This allows analysis across the entire range of management data (hardware, system software and application software). By placing this information in a data warehouse, an appropriate data-mining product can then be applied to mine the System Telemetry Warehouse to perform predictive analysis or spot interesting correlations.

Some of the features of the System Telemetry Warehouse include:

A collector for PerfMon counters.

A collector for Component Runtime Conditioning (CRC) data

A collector for Event Log data

A user interface for warehouse maintenance and data collection

An API for data collection.

FIG. 1 is a generalized block diagram illustrating the Warehouse Architecture. A set of collectors exists, which include the PerfMon collector (1000), Event Collector (1002), Application Collector (1004), other types of collectors (1006). All of these collectors can be initiated by the Warehous user interface 1014, or by an Optimizer client 1018. These collectors send data through the Warehouse API 1007 to the Warehouse component 1008. The Optimizer clients 1018 initiate queries to the Relational database 1020. The Relational database 1020 also sends schema information to the cube module 1012, which uses this information to create the framework of multi-dimensional data store 1016. Data from the Relational database 1020 is then used to populate the multi-dimensional data store 1016. Once the information is received and stored in the multi-dimensional store 1016, optimizer clients 1018 can use data mining algorithms 1022 to query the information.

Figure 2:
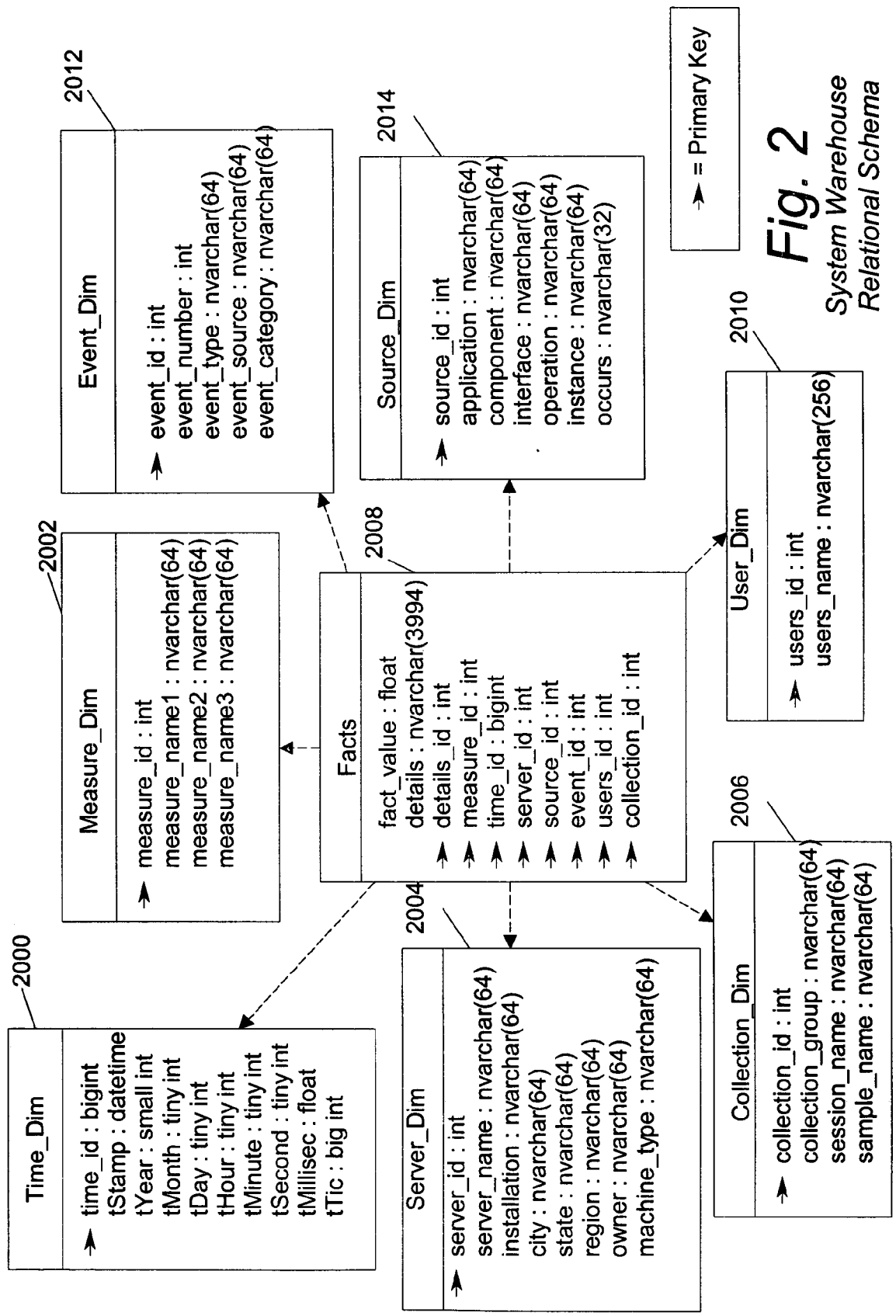
FIG. 2 is an illustration of the System Telemetry Warehouse Relational Schema.

FIG. 2 illustrates the relational schema for the System Telemetry Warehouse. The following describes in detail the tables included in the schema, their importance and their uses. The descriptions are as follows:

Time Dim

The $Time_{13}$ Dim table (2000) contains the Time dimension. Each row describes the time at which a measurement was taken. The tStamp column contains a consolidated timestamp as an SQL datetime typed value. However, the individual date and time values are also broken out into separate columns—tYear, tMonth, tDay, etc. The millisecond value contained in tStamp may vary slightly from that in the tMillisec column. That is because SQL datetime columns are only accurate to 3.33 milliseconds. The tMillisec column contains the more accurate value.

The tTic column is an optional column containing clock ticks. It enables time differentiation at a sub-millisecond level.

Measure Dim

The Measure_Dim table (2002) contains the Measure dimension. Each row describes a particular type of measurement. Measure_name is broken into three columns but only the first one is required.

For PerfMon counters, the three columns will contain the names of the PerfMon object, instance and counter, respectively. Examples include, Processor, _Total and % Idle Time. Or Physical Disk, _Total and Disk Reads/sec. Other measures may have fewer names such as "elapsed time" and therefore may use only a subset of the name columns.

If the measure is an event, the measure_name1 column will contain "EventMeasure". Further description of the event can be found in the Event dimension. nvarchar(64) is a SQL Server data type. Specifically it is a variable length Unicode string of up to 64 characters.

Server Dim

The Server_Dim table (2004) contains the Server dimension. Each row describes a machine on which data collection occurred. Information includes the server name, type, owner and geographic location. The client determines the values for these columns. Only the server name is required.

Collection Dim

The Collection_Dim table (2006) contains the Collection dimension. It supports the grouping of multiple measurement values. The table is pre-filled with a collection-group with a name of "None" for those clients who do not want to use collection groups.

Collection group is a name assigned by the client to represent a group of measures. This is the only required column. "Measures" can be anything in the Measure dimension. For example, a group of network related measures might be called "Network Usage".

Session_name is a name assigned by the client to represent a time period during which data for the associated group was collected, for example, MySession, Session1, or Friday.

Sample_name is a name assigned by the client to represent a specific sampling period within a session, for example, Sample1, AM, or PM.

Facts: The Relational Database 1020 (FIG. 2).

The Facts table (2008) contains all of the numerical measurements as well as references to each of the seven dimension tables. This table also contains optional text data associated with a particular occurrence of a fact value. Initial usage of the text column will be to store event descriptions. An example could be: "An error was detected on device \Device\CdRom0 during a paging operation." <for more information, see the section titled Event Dim below.> and method parameters, such as "(100, Smith)".

In a typical commercial data warehouse, the fact table contains one column for each type of measurement—sales amount, cost, number sold, etc. Such a schema is only practical if all of the types of measurements are known in advance. However, the System Telemetry Warehouse must be able to support the storage of various types of performance data at arbitrary times without requiring schema changes. To accommodate this, the System Telemetry Warehouse fact table contains all the numerical measurements such as, numerical values—1, 2, 99.3, etc. stored in a single column called fact_value. The Measure dimension is used to distinguish between the various types of measurements. The values in the fact table should only be aggregated if they have the same measure_id. NVARCHAR (3394) is a variable length Unicode string of up to 3994 characters.

User Dim

The User_Dim table (2010) contains the User dimension. Each row contains a column for the user's name. The table is pre-filled with an "Unknown" user name for those clients who don't wish to or cannot track users. NVARCHAR (256) is a variable length Unicode string of up to 256 characters.

Event Dim

The Event_Dim table (2012) contains the Event dimension. It was created to provide additional, event-specific information for measure values that are collected from the event logs. The following is an example which matches the event description example in the Facts section above.

event_type: Warning
event_source: Cdrom
event_category: <blank>
event_number: 51 (This is a real example from an event log. The number identifies which CD-ROM event occurred. It matches the event description example in the Facts section above).

It is pre-filled with an event_type of "Non-event" and an event_number of zero for use with any measure value, such as a PerfMon counter, which is not an event.

The event_number column corresponds to the Event column in the Event Viewer, which is a Microsoft GUI for the Windows event log. It contains the event number and is the only required column.

The event_type column corresponds to the Type column in the Event Viewer. It contains "information", "error", "warning", "audit success", or "audit failure".

The event_source column corresponds to the Source column in the Event Viewer. Examples of sources from a Windows System event log are "print", "DCOM", "Application Popup", "Netlogon", etc.

The event_category column corresponds to the Category column in the Event Viewer. This column is sometimes used by applications which create events but it is most often blank.

The name of the log the event came from is stored in the application column of the Source dimension 2014. For Windows event logs the values may be "system", "application", "security" or th nam of any custom log defined on th target partition of the Unisys ES7000 server. This column may contain the name of other types of log files as well.

An event's text description frequently has parameterized fields that will vary from occurrence to occurrence. Therefore, the event's text description is stored in the Details column in the Facts table 2008 rather than in the Event dimension, 2012.

The measured fact_value for "events" in block 2008 represents the number of times the event occurred at the referenced time. This value is usually one. If an event has no associated description to distinguish it from other occurrences of the same event and it occurs more than once within the same second, the fact_value will be the number of times it occurred within that second.

Source Dim

The Source_Dim table (2014) contains the Source dimension. Each row contains a description of the application that generated the measurement. Only the application column is required. It may contain values such as "PerfMon", "disk", "MSSQLSERVER", an event log name or a user application name.

The component column contains the name of a component within the application.

The interface column contains the name of the interface within the component.

The operation column contains the name of a method or procedure within the interface.

The instance column contains an id ntification of a particular instance or thread of the component.

<An example from software>

Application: System Telemetry Warehouse
Component: CM
Interface: clsAgent
Method: startcollecting
Instance: 4237

<An example from a made up application>

Application: Toy Store
Component: Accounting
Inteface: clsDebits
Method: payinvoice
Instance: 8736

The occurs column typically contains 1 of 3 possible values: "before", "after" or "delta". "Before" indicates that the measure value was recorded before the method was entered. "After" indicates that the measure value was recorded after the method was exited. "Delta" indicates that the measure value is the difference between the "before" and "after" values.

Figure 3:
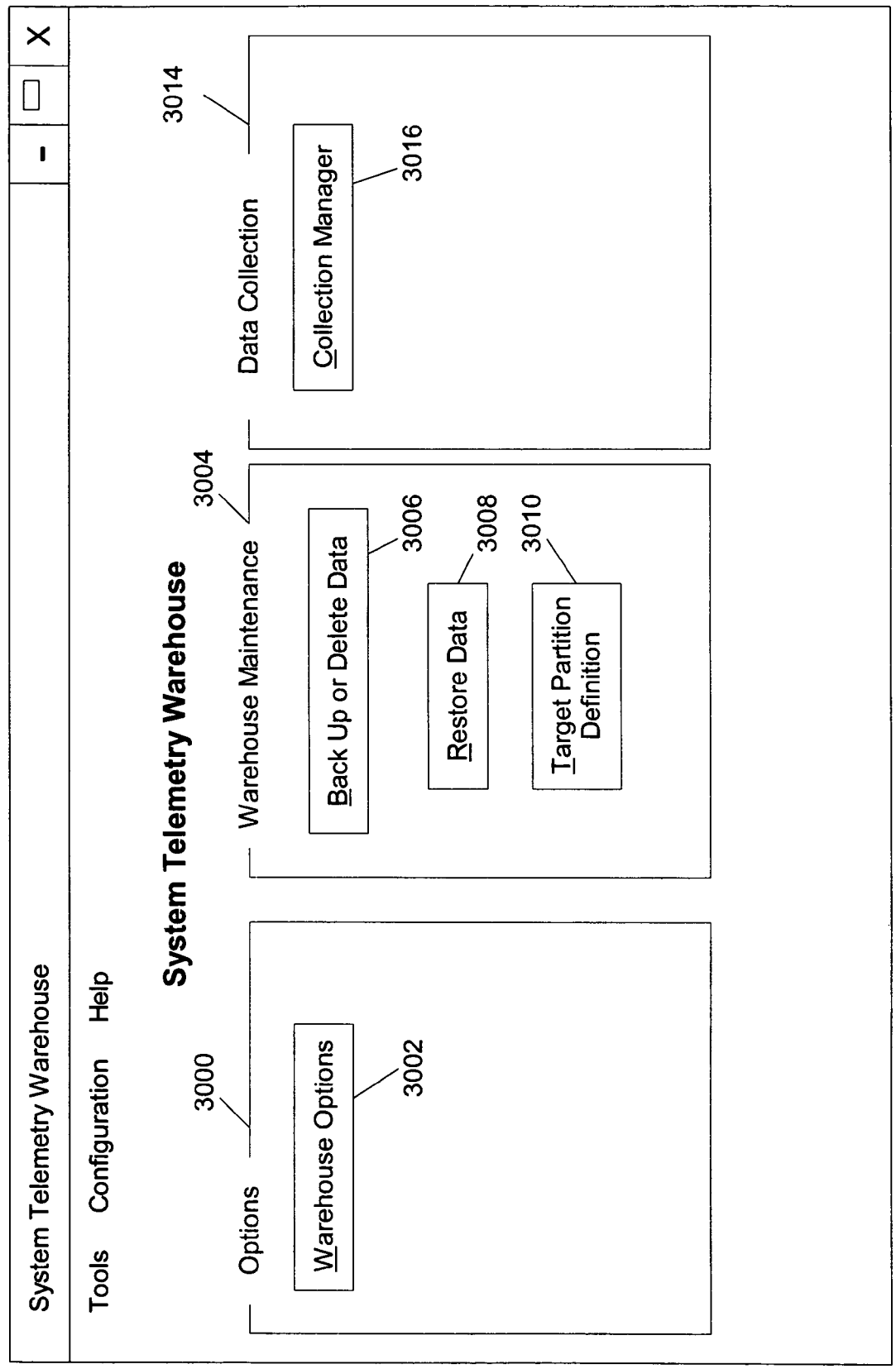
FIG. 3 is a screen shot of the System Telemetry Warehouse user interface.

FIG. 3 is a screen shot of the System Telemetry Warehouse user interface. A Windows-based graphical user interface that supports warehouse options (3000), warehouse maintenance (3004), and data collection (3014), are provided. This user interface can be launched from the Unisys Application Sentinel menu on the user's Start Menu.

The Warehouse options (3002) dialog is used to set various warehouse options. Initially those options will be the name of the folder to be used for warehouse backups and an option to enable the recording of status messages in the Application event log.

It should be noted that the warehouse maintenance section 3004 gives options for Target partition definition (3010), Backup or Delete data (3006), and Restore data (3008). These are options that are given to the user to choose from, as part of the user interface. Dialogs are provided which allow the user to perform various warehouse maintenance tasks. The Target Partition definition (3010) option goes to a dialog that allows the user to enter additional attributes for the target partitions (of the Unisys ES7000 Server) defined in the warehouse. This includes attributes such as machine type, location, owner, etc. During data collection, the only information stored in the warehouse about the target partition is its name. If additional attributes are defined, queries can then be made against the warehouse data using these attributes. The Backup or Delete data (3006) option within the warehouse maintenance (3004) portion allows the user to backup or remove warehouse data based on dimension information such as the time it was collected, the target partition from which it was collected, or the collection group name. The Restore data (3008) option allows the user to restore data to the warehouse that was previously backed up and removed.

Figure 4:
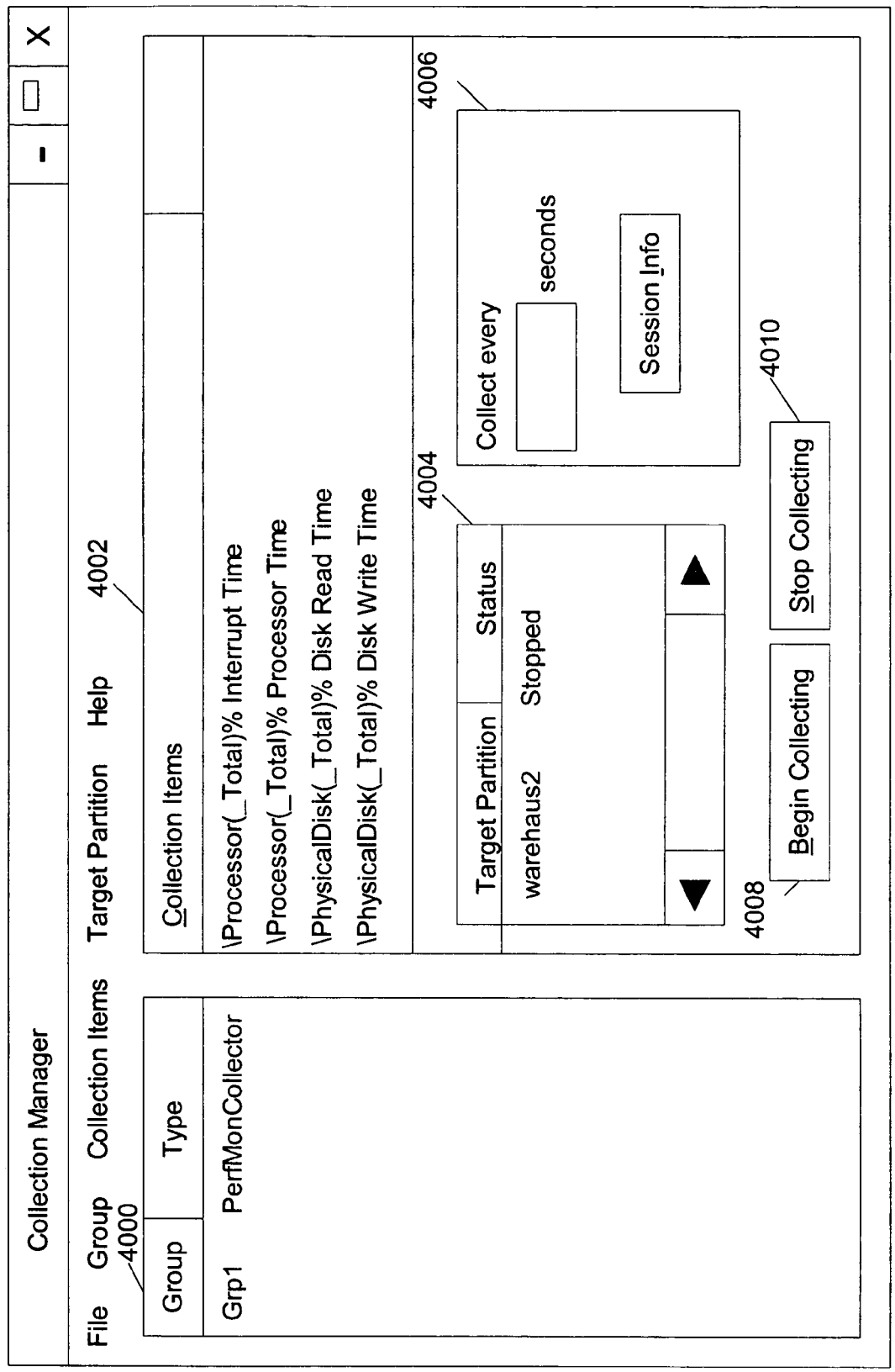
FIG. 4 is a screen shot of the data collection manager user interface.

The data collection (3014) option within the System Telemetry Warehouse user interface takes the user to a dialog which can be seen in further detail in FIG. 4.

FIG. 4 illustrates a dialog of the Collection Manager user interface as chosen from the data collection option 3016 in FIG. 3. This dialog gives the user the ability to define, initiate, and manage data collection. Alternatively, an "optimizer", shown in FIG. 1, may use the Collection Manager API to define, initiate and manage data collection.

The left pane contains a list of collection groups 4000. This pane is used to add and delete groups. The top right pane 4002 contains information for the currently selected group. This pane is used for editing that information. As an example, in the case of a PerfMon group, this information would be a list of PerfMon counters. In the case of an Event group, it would be the event type (Application, System, Security or some custom event log) and an optional file name for an external event log file. The information contained in these two panes is stored on the Management Server and is available to all users via the GUI or the API.

The two panes on the bottom right (4004, 4006) contain information relative to data collection for a specific user. This information is stored on the client workstation and is only available via the GUI. The middle pane 4004 in FIG. 4 lists all target partitions defined for the currently selected group as well as the collection status of each target partition. This pane is used to add and delete target partitions.

The bottom right pane 4006 lists collection-4220X parameters for the currently selected target partition. The collection frequency in seconds is required. The buttons in this pan will vary depending on the type of collection group currently selected.

The two buttons at the bottom of the dialog are used to start (4008) and stop (4010) data collection for the currently selected group and target partition.

Collection Manager API

The Collection Manager API allows System Telemetry Warehouse clients to interface to the collection system for the purpose of defining and initiating the collection of performance data. This API is used by the Collection Manager user interface (FIG. 4) as well as by other optimizer clients (1018, FIG. 1). The functions provided by this interface allow clients to:

Define and manage groups of performance counters.
Initiate and stop data collection.
Check on the status of data collection.

The Collection Manager is installed as a COM+ application. Clients on remote machines can access the interface via DCOM.

PerfMon Collector (1000, FIG. 1)

Collection of Windows performance metrics (PerfMon counters) is provided. Clients may specify which counters are to be collected and the frequency (in seconds) at which collection should occur.

CRC Collector (1004, FIG. 1):

Collection of Component Runtime Conditioning (CRC) data is provided. The data collection functions are provided by th CRC project, which is described in the glossary. Unlike other data collectors, the CRC collector is not initiated or managed by the Collection Manager. The warehouse loading functions are provided by the System Telemetry Warehouse program and packaged with CRC.

Event Log Collector (1002, FIG. 1)

Collection of Event Log data is provided. Data can be collected from the standard Microsoft Windows logs—Application, System, and Security—as well as any custom log file that adheres to the same file format.

Clients may specify that the collection should start at the current point in time. In this case, only events generated after collection started would be collected. Alternatively, clients may specify that the collection start where a prior collection stopped. Thus, existing events would be collected along with new events. If there were no prior collection, the entire log file would be collected.

User Interface (FIG. 3)

A Windows-based graphical user interface (GUI) that supports the following functions is provided:

Warehouse maintenance 3006, 3008—The removal of warehouse data based on dimension information such as time, machine name, or collection group. Functions are also provided to backup data prior to removal and to subsequently restore it to the warehouse.

Data Collection 3014—The ability to define, initiate, and manage data collection dir ctly without running an optimizer. An optimizer is an software program which uses the System Telemetry Warehouse to collect and store performance metrics which the optimizer then analyzes to make recommendations regarding how to improve system performance.

Target Partition definition 3010—Provides the ability to define additional attributes in the warehouse for the target partitions in the Unisys ES7000. This includes attributes such as machine type, location, owner, etc. During data collection, the only information stored in the warehouse about a target partition is its name. Providing additional attributes allows queries against the warehouse data using those attributes.

Warehouse options 3002—The setting of various warehouse options. This includes but is not limited to the name of the folder to be used for warehouse backups and an option to enable the logging of collection status messages.

FIG. 5 is a screen shot of the Back Up or Delete Data dialog in the System Telemetry Warehouse user interface. The seven tabs at the top of the dialog represent the seven dimensions in the warehouse schema FIG. 2. Data can be selected based on dimension values such as the time it was collected or the name of the target partition it was collected from. The tab for the Time dimension is shown in FIG. 5. The buttons at the bottom of th dialog are used to initiate the back up or delete actions.

Figure 6:
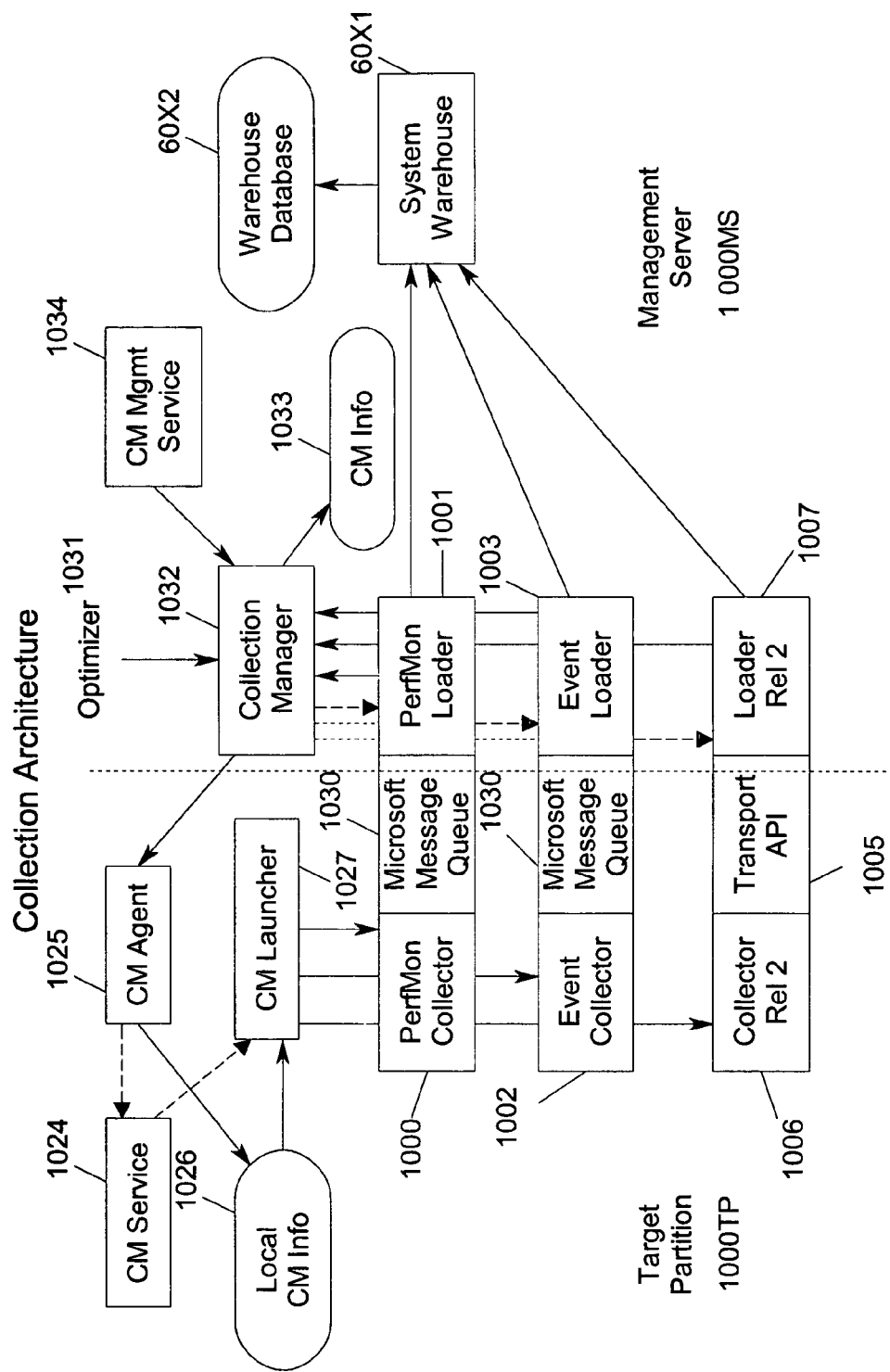
FIG. 6 is a diagram of the collection architecture supporting the System Telemetry Warehouse.

FIG. 6 is a generalized block diagram illustrating the Collection Architecture. Comparing this to FIG. 1, the Warehouse Architecture, the right side (FIG. 1, 1008-1022) has been reduced to two items, System Warehouse 60X1 and the Warehouse Database 60X2 in FIG. 6. The list of collectors (FIG. 1, 1000-1006) on the left side of FIG. 1 has been expanded in FIG. 6 to show the full collection architecture. The left side of FIG. 6 represents the Target Partition 1000TP where data collection is performed and the right side represents the Management Server 1000MS where the data is loaded into the warehouse.

Collectors are actually pairs of modules, a collector (1000, 1002, 1006) running on the Target Partition 1000TP and transmitting data to the Management Server 1000MS where a loader (1001, 1003, 1007) on the Management Server 1000MS receives the data and loads it into the Warehouse 60X2. This architecture is an extensible architecture which allows for the addition of future collector/loader pairs. Modules are provided for PerfMon (1000/1001) and Event (1002/1003) data. Modules can be provided in the future for other types of data (1006/1007). Microsoft Message Queue (1030) is used to transport PerfMon and Event data from the Target Partition 1000TP to the Management Server 1000MS. Future collector/loader pairs may choose a different transport mechanism (1005).

The Collection Manager API is provided to Optimizers 1031 and to the Warehouse User Interface (1014, FIG. 1) by the Collection Manager component 1032. This component initiates collectors (1000, 1002, 1006) on remote targets via the CM Agent 1025. It also initiates the corresponding loaders (1001, 1003, 1007) on the Management Server 1000MS.

CM Info 1033 contains collection definition and status information for the Collection Manager 1032.

The System Warehouse module 60X1 provides an API for the loaders (1001, 1003, 1007) to the Warehouse Database 60X2.

CM Mgmt Service 1034 performs recovery for collections which failed due to network or server failures.

On the Target Partition 1000TP, CM Agent 1025 handles collection requests from the Collection Manager 1032 on the Management Server 1000MS. Information about collections in progress is stored in Local CM Info 1026.

CM Service 1024 initiates CM Launcher 1027 which in turn, manages the pool of running collectors (1000, 1002, 1006).

Described herein has been a method and system for collecting and storing performance metrics and system events of a server network utilizing different platforms. A data warehouse is established in a star schema format to store the performance data in a manner that subsequent data mining algorithms can be used to analyze the performance data so as to enable operating improvements over hardware, system software and application software. The warehouse data is organized in multi-dimensional cubes based on a fact table surrounded by multiple dimension tables so that no matter the applications used, the schema does not need to be altered or changed. Appendix I is an example of a SQL stored procedure:

While one embodiment of th invention has been illustrated, other embodiments are possible which are still defined by the attached claims.

APPENDIX I

The following is an example of an SQL stored procedure that aggregates a specific PerfMon counter. The input parameters for this procedure are the PerfMon object, instance and counter identifiers, the name of the machine on which it was collected and the time period when it was collected.

```
CREATE PROCEDURE sw_Perfmon_aggregates
,@pObject nvarchar(64)
,@pInstance nvarchar(64)
,@pCounter nvarchar(64)
,@pServer nvarchar(64)
,@pStart datetime
,@pEnd datetime
AS
SELECT SUM(f.fact_value) AS 'Sum'
,COUNT(f.fact_value) AS 'Count'
,AVG(f.fact_value) AS 'Avg'
,MIN(f.fact_value) AS 'Min'
,MAX(f.fact_value) AS 'Max'
FROM Facts AS f
,Measure_Dim AS m
,Server_Dim AS svr
,Time_Dim AS t
WHERE t.time_id =f.time_id
   --join Facts to Time_Dim
AND svr.server_id =f.server_id
   --join Facts to Server_Dim
AND m.measure_id =f.measure_id
   --join Facts to Measure_Dim
AND m.measure_name1 =@pObject
   --PerfMon object name
AND m.measure_name2 =@pInstance
   --PerfMon instance name
AND m.measure_name3 =@pCounter
   --PerfMon counter name
AND svr.server_name =@pServer
   --Server name
AND t.tstamp BETWEEN @pStart AND @pEnd
   --restrict time range
GO
```

What is claimed is:

1. In a network of local and remote server machines, incorporated as software on a computer medium, which supports a multi-function, multi-partitioned series of operating systems, a method for establishing an original warehouse database of performance data, usable by clients, comprising the steps of:
   (a) collecting performance data directly from said local and remote server machines including the step of:
      (a1) interfacing a collection manager API for allowing clients direct access to a data collection system to initiate collection of performance data;
      said interfacing including the steps of:
         (a1a) defining and managing groups of performance counters;
         (a1b) initiating the start of data collection;
         (a1c) stopping the cycle of data collection;
         (a1d) checking the status of a data collection cycle;
   (b) organizing and storing said performance data in a relational database and including the steps of:
      (b1) developing said original warehouse database having a multidimensional data store as a star schema, and which includes the step of:
         (b1a) establishing a star schema of tables wherein a fact table, having rows each containing
            (i) a single measured numeric value;
            (ii) an optional text string: and
            (iii) cross references to other tables, is surrounded by and interconnected to multiple dimension tables which provide various metric attributes for each row in said fact table; and
         (b1b) providing information from said series of operating systems directly to said star schema without need to reconfigure said original database;
      (b2) storing collected performance data in cube formats in said multidimensional data store, arranged as a star schema said collected performance data being capable of storing various kinds of performance data at various times without requiring schema changes;
      (b3) accessing said collected performance data for analysis of server operations.

2. A computer readable storage medium storing computer program including instructions, executed by a computing system, causes the computing system to implement the method of claim 1.

3. A computer readable storage medium incorporating a computer program which operates to perform the method of claim 1.

4. A system utilizing local and remote servers and which supports a multi-function, multi-partition series of operating systems, said system for creating a warehouse database made up of performance data comprising:
   (a) collection manager means for gathering performance data on remote machines and including:
      (a1) managing means for multiple collection means having directly connected data collectors for Perfmon counters, for event logs and component performance information;
      (a2) said managing means providing data collection on local digital machines and multiple remote digital machines, including servers;
   (b) means for directly loading said data collectors into a System Telemetry Warehouse means to provide an original database:
   (c) said System Telemetry means including:
      (c1) star schema means for storing various types of performance data Provided by said series of operating systems without the need for schema changes, said star schema means including:
         (c1a) a fact table of rows where each row contains
            (i) a single measured numeric value;
            (ii) an optional text string;
            (iii) cross references to other tables;
         (c1b) multiple dimensional tables which surround each said fact table wherein said dimension tables hold descriptive information about measured values including measurement name, machine on which it was collected, and the time of collection;

(d) means for using SQL queries for enabling data retrieval and analysis from said original database;

(e) means for creating multi-dimensional data stores in a star schema permitting clients to use multi-dimensional queries to access performance data for analysis.

5. The system of claim 4 wherein said (d) means for using SQL queries includes:

(d1) means for clients of said System Telemetry Warehouse means to directly interface said collection system managing means in order to define and to initiate collection of performance data without need to make schema changes to said original database;

(d2) interface means permitting clients to:
  (i) define and manage performance counters;
  (ii) initiate and stop data collection;
  (iii) check on the status of data collection.

6. A computer readable storage medium storing computer program including instructions executed by a computing system, causes the computing system to utilize the listed means of claim 4.

* * * * *